United States Patent
Matumoto et al.

(10) Patent No.: US 6,946,971 B2
(45) Date of Patent: Sep. 20, 2005

(54) ELECTRONIC EQUIPMENT CONTROL SYSTEM AND CONTROL METHOD

(75) Inventors: Isao Matumoto, Saitama (JP); Hironori Kobayashi, Saitama (JP); Norifumi Nishida, Saitama (JP); Makoto Fukuya, Saitama (JP); Naoya Shibata, Tokyo (JP); Tetsuya Natori, Tokyo (JP); Kouji Maeda, Tokyo (JP)

(73) Assignee: Pioneer Corporation, Tokyo (JP)

( * ) Notice: Subject to any disclaimer, the term of this patent is extended or adjusted under 35 U.S.C. 154(b) by 334 days.

(21) Appl. No.: 10/308,008

(22) Filed: Dec. 3, 2002

(65) Prior Publication Data

US 2003/0120356 A1 Jun. 26, 2003

(30) Foreign Application Priority Data

Dec. 6, 2001 (JP) .................................. P2001-373165

(51) Int. Cl.$^7$ .................. G08C 19/00; H04Q 7/00; H05K 7/00; H05K 7/14; H05K 7/16
(52) U.S. Cl. .............. 340/825.72; 340/825.69; 318/16; 361/727; 361/729; 361/798; 369/2; 369/75.1; 381/86
(58) Field of Search .............. 340/825.72, 825.69; 318/16; 361/727, 729, 798, 814, 679; 369/2, 75.1, 12; 381/86; 439/12, 297; 720/619, 647; 701/1, 36; 296/37.5

(56) References Cited

U.S. PATENT DOCUMENTS 4,684,164 A      8/1987  Durham
5,815,468 A  *  9/1998  Muramatsu et al. .......... 369/12
5,848,042 A  * 12/1998  Takahashi et al. .......... 720/647
5,862,468 A  *  1/1999  Kim .......................... 720/646
D410,650  S  *  6/1999  Hara ......................... D14/168
6,268,837 B1  *  7/2001  Kobayashi et al. .......... 701/208
6,570,495 B1  *  5/2003  Lavelle et al. ............... 701/36
6,642,852 B2  * 11/2003  Dresti et al. ........... 340/825.72
6,781,519 B1  *  8/2004  Diaz ..................... 340/825.72
6,831,708 B2  * 12/2004  Tajima ....................... 361/685
2001/0011664 A1      8/2001  Meritt
2003/0007649 A1  *  1/2003  Riggs .......................... 381/86

FOREIGN PATENT DOCUMENTS

EP    0 868 116 A1    9/1998
EP    0 902 548 A2    3/1999
WO    WO 00/38951 A1  7/2000

* cited by examiner

*Primary Examiner*—Brian Zimmerman
*Assistant Examiner*—Clara Young
(74) *Attorney, Agent, or Firm*—Sughrue Mion, PLLC

(57) ABSTRACT

An electronic equipment control system including an electronic equipment body and a remote control terminal for providing an operation instruction to the electronic equipment body. The electronic equipment body has a receiving part for receiving a remote control signal, a movable operation unit for operating the electronic equipment body, a fixed operation unit, and an arranging part for moving the movable operation unit to bring the fixed operation unit into a visually identifiable state. The remote control terminal has input keys for providing the operation instruction, and a sending part for sending operation information input by the input keys.

19 Claims, 10 Drawing Sheets

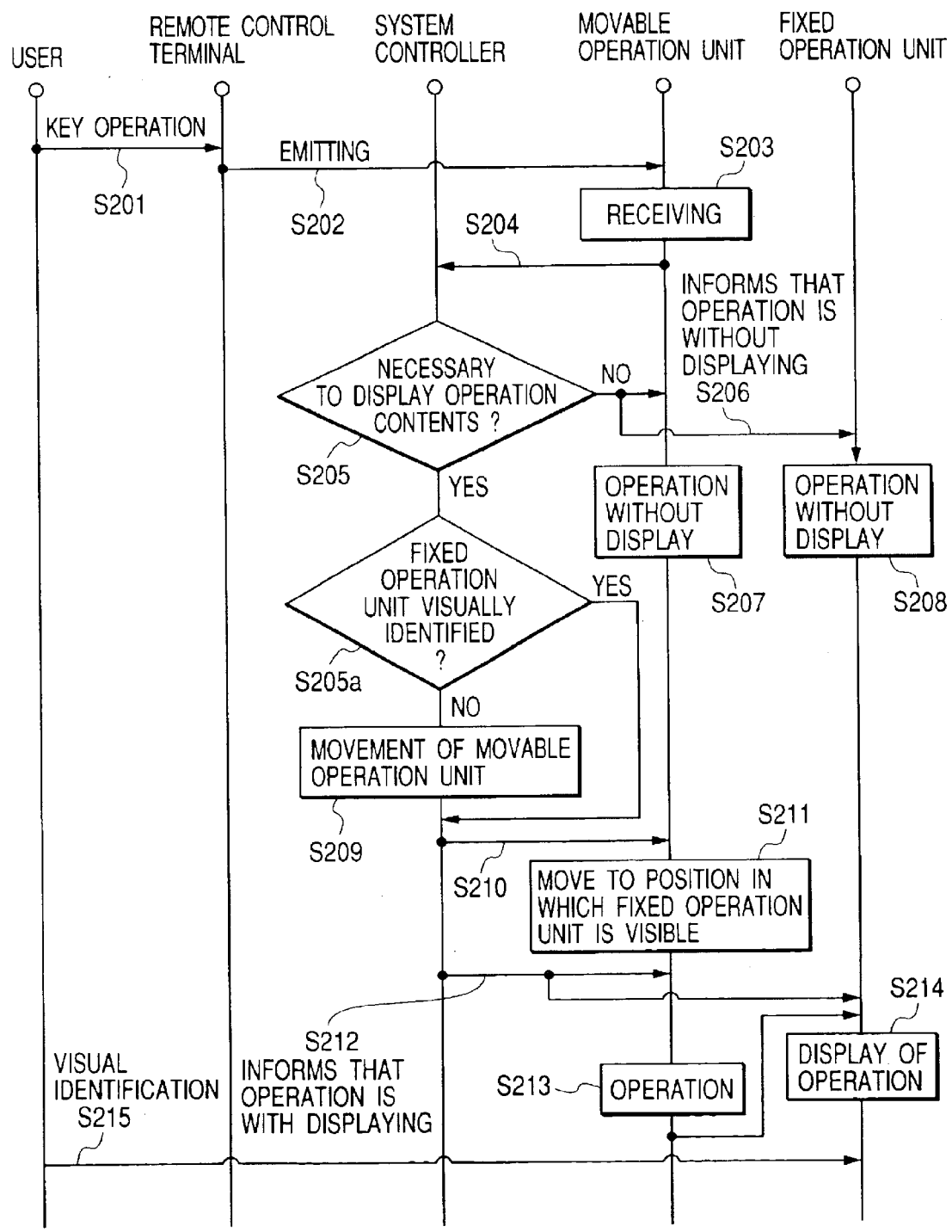

ELECTRONIC EQUIPMENT CONTROL SYSTEM AND CONTROL METHOD

The present disclosure relates to the subject matter contained in Japanese Patent Application No. 2001-373165 filed Dec. 6, 2001, which is incorporated herein by reference in its entirety.

BACKGROUND OF THE INVENTION

1. Field of the Invention

The present invention relates to a control system and a control method of an electronic equipment mounted in a mobile unit such as a vehicle.

2. Description of the Related Art

Conventionally, various car audio apparatus such as a CD (Compact Disc) player, a DVD player, an MD (Mini Disc) player and an AM/FM tuner mounted in an instrument panel of a vehicle, and a car audio apparatus in which these are combined integrally or in which these are integrated with a navigation apparatus are used as electronic equipments. Also, there is a type having means for operating the electronic equipment by remote control.

In these car audio apparatus, operation functions tend to increase and the operation tends to become complicated. As a measure to this, a system in which two operation units are provided oppositely backward and forward in the front of a car audio apparatus and operation functions or display functions are distributed and provided to the respective operation units has been proposed. Further, a system for performing operation by remote control in addition to such an apparatus has been proposed.

However, in the system using the two operation units, the used operation unit needs to be placed in a position capable of visual identification. When it is necessary to use a function of the operation unit of the back side after identifying operation contents each time, the operation of the original car audio apparatus must be performed after placement in a position in which its operation unit is visible and operable.

Also, in the system capable of remote control while using the two operation units, when an operation key corresponding to a remote control signal is present in the side of the hidden operation unit, the remote control signal is not received or is made invalid. Or in this case, it is necessary for a user to perform a remote control operation after checking whether an operation key which the user wants to operate is in the front side or the back side by a visual inspection. Further, it may be necessary to perform the remote control operation after moving the operation unit of the front side so as to be able to visually identify the operation unit of the back side. As a result of these, the speedy remote control operation becomes difficult and it also has a bad influence on a psychological state of a driver.

SUMMARY OF THE INVENTION

An object of the present invention is to provide an electronic equipment control system and a control method thereof capable of operating electronic equipment by remote control without caring a hidden operation unit.

According to an aspect of the present invention, there is provided an electronic equipment control system comprising: an electronic equipment body; and a remote control terminal for providing an operation instruction to the electronic equipment body, wherein the electronic equipment body comprises: a receiving part for receiving a remote control signal; a first operation unit to be operated according to the received remote control signal; a second operation unit disposed in the back of the first operation unit and operated according to the received remote control signal; and an arranging part for moving at least one of the first and second operation units to bring both of the first and second operation units into a visually identifiable state, wherein the remote control terminal comprises: an input key for providing the operation instruction; and a sending part for sending the operation instruction to the electronic equipment body as the remote control signal.

According to the electronic equipment control system of the invention, for example, the electronic equipment body including an audio reproducing apparatus for reproducing a CD, a DVD or an MD is controlled by the remote control terminal. In a front panel portion of the electronic equipment body, there are the first operation unit for operating the electronic equipment and the second operation unit provided in the back.

In case in which an operation instruction relating to use of a second operation unit function is sent from the remote control terminal, the arranging part moves the first operation unit or the second operation unit or both of them and brings an operation surface of the second operation unit into a visible state so that a user can easily identify the operation surface of the second operation unit. Thus, a remote control operation through the second operation unit can be performed preferably.

Many operation keys or associated operation means and further a relatively large display device can be provided on a predetermined front portion in the electronic equipment body. The present invention is applicable to a vehicle-mounted audio apparatus which requires a small front size.

In one aspect of an electronic equipment control system of the invention, the first operation unit comprises display part for displaying information about an operation or an operation state of the first operation unit.

According to this aspect, information or an operation state about the operation unit is displayed on a screen of the display part such as an LCD (Liquid Crystal Display) device and an EL (Electro-Luminescence) display device desposed on the first operation unit that is placed in the front side normally.

Many operation keys or operation means shall be provided in the first operation unit, and it is difficult to provide display means for displaying much information or detailed information within a narrow area, but simple information or summarized information can be checked by the display part of the first operation unit.

In another aspect of an electronic equipment control system of the invention, the second operation unit comprises display part for displaying information about an operation or an operation state of at least one of the first and second operation units.

According to this aspect, information or an operation state about the first operation unit or the second operation unit is displayed on a screen of the display part such as an LCD device and an EL display device disposed on the second operation unit that is provided in the back of the first operation unit normally. Since the second operation unit has fewer operation keys as compared with the first operation unit, a large display device with fine accuracy can be provided. That is, it may be constructed so that a relatively small display device is provided in the first operation unit and a relatively large display device is provided in the second operation unit. Therefore, detailed information about the first operation unit as well as information about the second operation unit can be displayed on the display device provided in the second operation unit, and a user can operate electronic equipment while checking the detailed information displayed.

In this aspect, when the remote control signal relates to an operation to be displayed on the display part provided in the second operation unit, it may be constructed so that the arranging part works bring the second operation unit into a visually identifiable state when the second operation unit is in a visually unidentifiable state.

In the case of thus structured, it is unnecessary for a user to be aware whether or not there is a remote control operation about an operation to be displayed on the display part provided in the second operation unit. That is, when there is the remote control operation about an operation to be displayed on the display part provided in the second operation unit, the second operation unit is automatically brought into a visually identifiable state, so that it is very convenient for the user.

In this aspect, when the second operation unit is not in a state capable of visual identification from the outside, it may be constructed so that the power source of at least the display part of the second operation unit is turned off.

In the case of being constructed thus, deterioration with time of the display part by supplying a power source to the second operation unit in a state hidden in the back of the first operation unit can be prevented effectively, and life extension and low power consumption of the whole apparatus can be achieved.

In another aspect of an electronic equipment control system of the invention, when the remote control signal relates to use of a second operation unit function, the second operation unit does not perform an operation corresponding to the remote control signal when it is not in a state capable of visual identification from the outside, and performs the operation corresponding to the remote control signal when it is in the state capable of visual identification from the outside.

According to this aspect, when the remote control signal relates to use of a second operation unit function, the operation corresponding to the remote control signal is performed when the second operation unit is in the state capable of visual identification from the outside. On the other hand, the operation corresponding to the remote control signal is not performed when the second operation unit is not in the state capable of visual identification from the outside, so that an accidental action by a user can be prevented from being performed in the second operation unit due to an input miss in a state in which the second operation unit cannot be visually identified.

Preferably, when the remote control signal relates to use of a second operation unit function, the arranging part is actuated so that the second operation unit can be visually identified from the outside when the second operation unit is not in the state capable of visual identification from the outside. As a result of that, after the second operation unit has become the state capable of visual identification from the outside, an operation corresponding to this remote control signal or corresponding to a remote control signal inputted again is performed.

In a further aspect of an electronic equipment control system of the invention, the electronic equipment body comprises a determination part for determining whether or not the received remote control signal relates to use of a second operation unit function.

According to this aspect, it is determined whether or not an operation signal sent from the remote control terminal relates to use of a second operation unit function. Therefore, according to its determined result, the first operation unit or the second operation unit can be moved properly by the arranging part and further, on-off control of a power source in the second operation unit can be performed according to the determined result.

In this aspect, when it is determined that the remote control signal received by the determination part relates to use of a second operation unit function, it may be constructed so that the arranging part works to bring the second operation unit into a visually identifiable state.

In the case of being constructed thus, when it is determined that the remote control signal relates to use of a second operation unit function, the arranging part works and the first operation unit moves to a predetermined position and a display device of the second operation unit can be visually identified. Also, it may be constructed so as to perform arrangement in which it is more easy for a user to visually identify by moving the second operation unit as well as the first operation unit. In this case, it is also necessary to provide a mechanism equal or similar to a mechanism for moving the first operation unit in the second operation unit. As results of these, a user can preferably perform a remote control operation through the second operation unit without being aware whether the remote control signal relates to use of a function which the first operation unit has or use of a function which the second operation unit has.

Or in this aspect, when it is determined that the remote control signal received by the determination part relates to use of a second operation unit function, it may be constructed so that the power source of the second operation unit is turned on.

In the case of being constructed thus, when it is determined that the remote control signal relates to use of a second operation unit function, the power source of the second operation unit is turned on. Therefore, subsequent to this time, an operation by the second operation unit is enabled. Subsequently, the power source of the second operation unit may successively be in an on state until an off operation by its power source button is performed or may be turned off automatically on condition that no use is made for a certain period. As results of these, a user can preferably perform a remote control operation through the second operation unit without being aware whether the remote control signal relates to use of a function which the first operation unit has or use of a function which the second operation unit has.

In a further aspect of an electronic equipment control system of the invention, the receiving part is provided in the first operation unit.

According to this aspect, the receiving par for receiving the remote control signal from the remote control terminal is provided in the first operation unit placed in the front of electronic equipment normally, so that the remote control signal can be received regardless of an operation state of the electronic equipment. Also, it may be constructed so that a signal about the second operation unit is also received by this receiving part and is offered to an operation of the second operation unit or is offered to movement of the first operation unit by the arranging part.

In a further aspect of an electronic equipment control system of the invention, the receiving part is provided in the front of a cabinet of the electronic equipment body.

According to this aspect, the receiving part is provided in the front of the electronic equipment body exposed to the user side always, so that the remote control signal from the remote control terminal can be received regardless of placement of the first operation unit and the second operation unit.

In a further aspect of an electronic equipment control system of the invention, the remote control signal by the sending part is sent using infrared rays.

According to this aspect, the remote control signal from the remote control terminal is radiated toward the electronic equipment body by modulating the infrared rays. As an element offered to the modulation, a semiconductor light emitting element for emitting the infrared rays is preferably used from the low voltage operation, low power consumption and wide band modulation characteristics.

In a further aspect of an electronic equipment control system of the invention, the remote control signal by the sending part is sent using weak radio waves.

According to this aspect, the remote control signal from the remote control terminal is radiated toward the electronic equipment body by modulating the weak radio waves. As the weak radio waves, for example, radio waves of 2 Ghz band known as Bluetooth standards can be used. Also, a small antenna is used as the receiving part in the electronic equipment body.

In a further aspect of an electronic equipment control system of the invention, the electronic equipment body comprises at least one of a reproducing part for reproducing music content information, a radio broadcast receiving part and a television broadcast receiving part.

According to this aspect, music reproduction, radio broadcast receiving and television broadcast receiving can be enjoyed under the electronic equipment control system of the invention.

In a further aspect of an electronic equipment control system of the invention, a slot for record medium insertion is provided in the electronic equipment body so as to being exposed at the time of moving the second operation unit.

According to this aspect, a slot for record medium insertion of CD, DVD, MD, cassette tape, etc. is exposed by moving the second operation unit. Therefore, a user can properly insert such a record medium with such a slot exposed.

In a further aspect of an electronic equipment control system of the invention, the electronic equipment body further comprises a third operation unit for operating the electronic equipment body while being exposed at the time of moving the second operation unit, and when the remote control signal relates to use of a third operation unit function, the arranging part moves the second operation unit and is shifted to a state in which the third operation unit can be visually identified from the outside.

According to this aspect, when the remote control signal relates to use of a third operation unit function, the arranging part works and it is shifted to a state in which the third operation unit can be visually identified from the outside and a remote control operation through the third operation unit can be performed preferably.

According to a further aspect of the present invention, there is provided an electronic equipment control method in an electronic equipment control system comprising an electronic equipment body and a remote control terminal for providing a operation instructions to the electronic equipment body, the method comprising: a receiving step of receiving a remote control signal by the electronic equipment body; a first operation step of operating the electronic equipment body according to the received remote control signal by a first operation unit of the electronic equipment body; a second operation step of operating the electronic equipment body according to the received remote control signal by a second operation unit provided in the back of the first operation unit; a arrangement step of moving at least one of the first and second operation units to bring both of the first and second operation units into a visually identifiable state; an input step of inputting an operation instruction to the electronic equipment body by input keys of the remote control terminal; and a sending step of sending the operation instruction toward the electronic equipment body by the remote control terminal as the remote control signal.

According to the electronic equipment control method of the invention, in a manner similar to the case of the electronic equipment control system of the invention described above, in the case that an operation instruction relating to use of a function of the second operation unit is sent from the remote control terminal, when it is placed so that the first operation unit or the second operation unit or both the operation units move and an operation surface of the second operation unit is visible to a user so that it is easy for the user to visually identify the operation surface of the second operation unit by the arranging part, a remote control operation through the second operation unit can be performed preferably. Therefore, many operation keys or associated operation means can also be provided on a predetermined front portion in the electronic equipment body and, for example, it can be preferably used in a vehicle-mounted audio apparatus for limiting a front size.

In one aspect of an electronic equipment control method of the invention, in the electronic equipment body, there is further executed a determination step of determining whether or not the received remote control signal relates to use of a function which the second operation unit has, and when it is determined that the remote control signal received by the determination step relates to use of a function which the second operation unit has, it is shifted to a state in which the second operation unit can be visually identified from the outside by the arrangement step.

According to this aspect, when it is determined that the remote control signal by the determination part relates to use of a function which the second operation unit has, the arranging part works and the first operation unit moves to a predetermined position and a display device of the second operation unit can be visually identified. Also, it may be constructed so as to perform placement in which it is easy for a user to visually identify more by moving the second operation unit as well as the first operation unit. In this case, it is also necessary to provide a mechanism equal or similar to a mechanism for moving the first operation unit in the second operation unit. As results of these, a user can preferably perform the remote control operation without being aware whether the remote control signal relates to use of a function which the first operation unit has or use of a function which the second operation unit has.

Also, in the electronic equipment control method of the invention, various aspects similar to various aspects in the electronic equipment control system of the invention described above can be implemented.

Such operation and other advantages of the invention will become apparent from the following embodiment described.

BRIEF DESCRIPTION OF THE DRAWINGS

FIG. 10 is a sequence chart showing an relation of components of the electronic equipment control system.

DETAILED DESCRIPTION OF THE PREFERRED EMBODIMENTS

Figure 1:
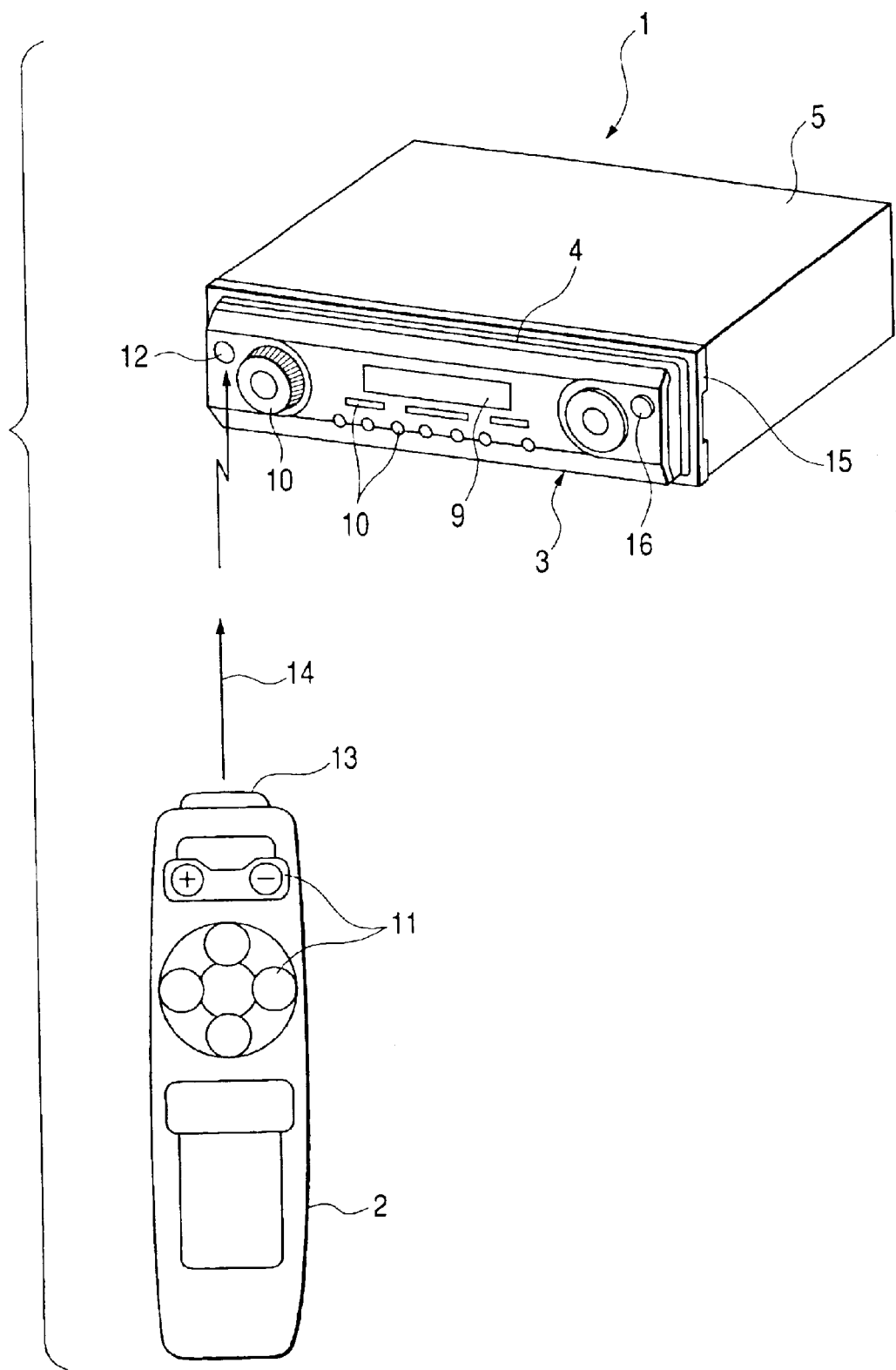
FIG. 1 is an external view showing an electronic equipment body and a remote control terminal constituting an electronic equipment control system of the invention.
Figure 2:
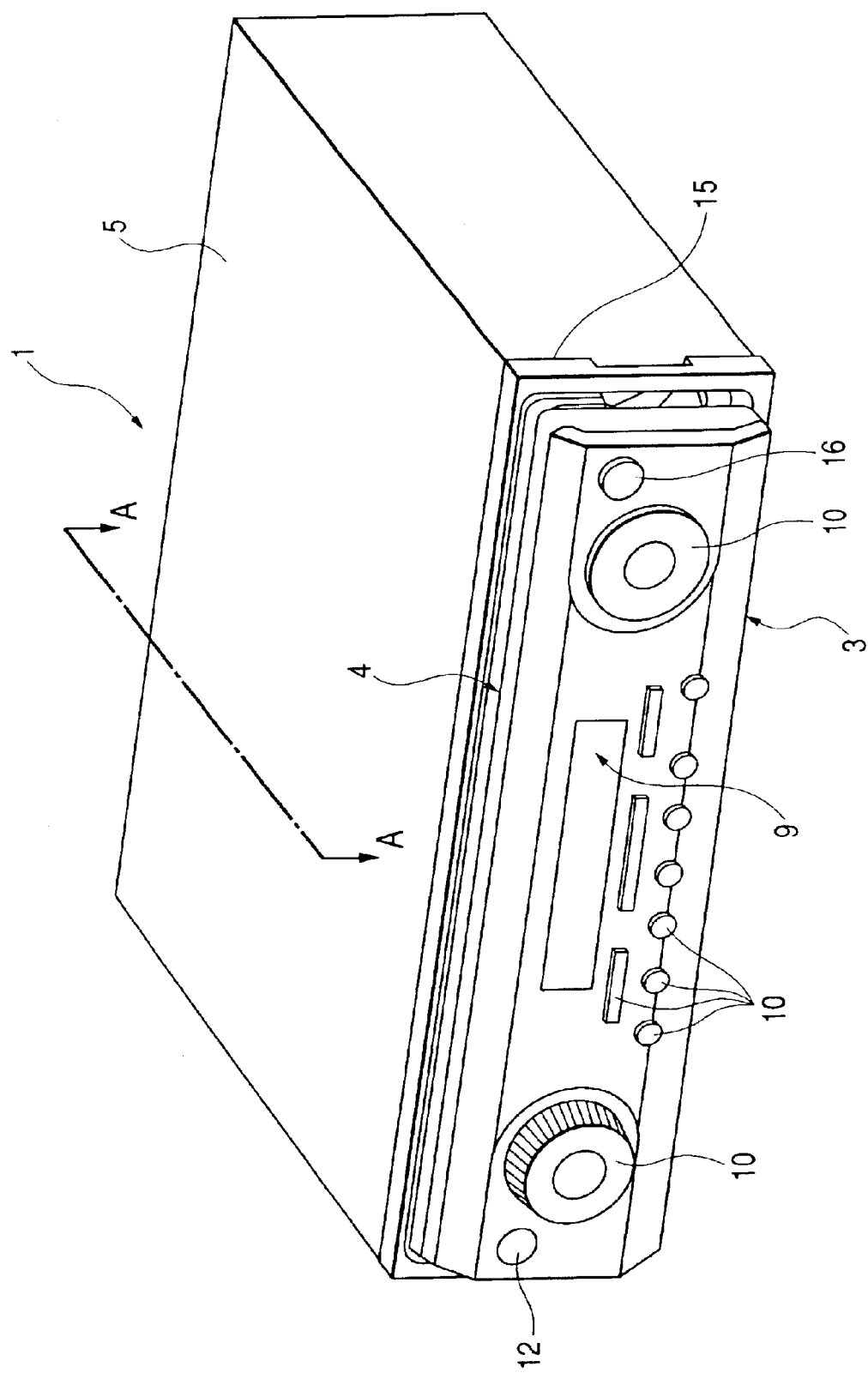
FIG. 2 is a perspective view showing a configuration of the electronic equipment body.
Figure 3:
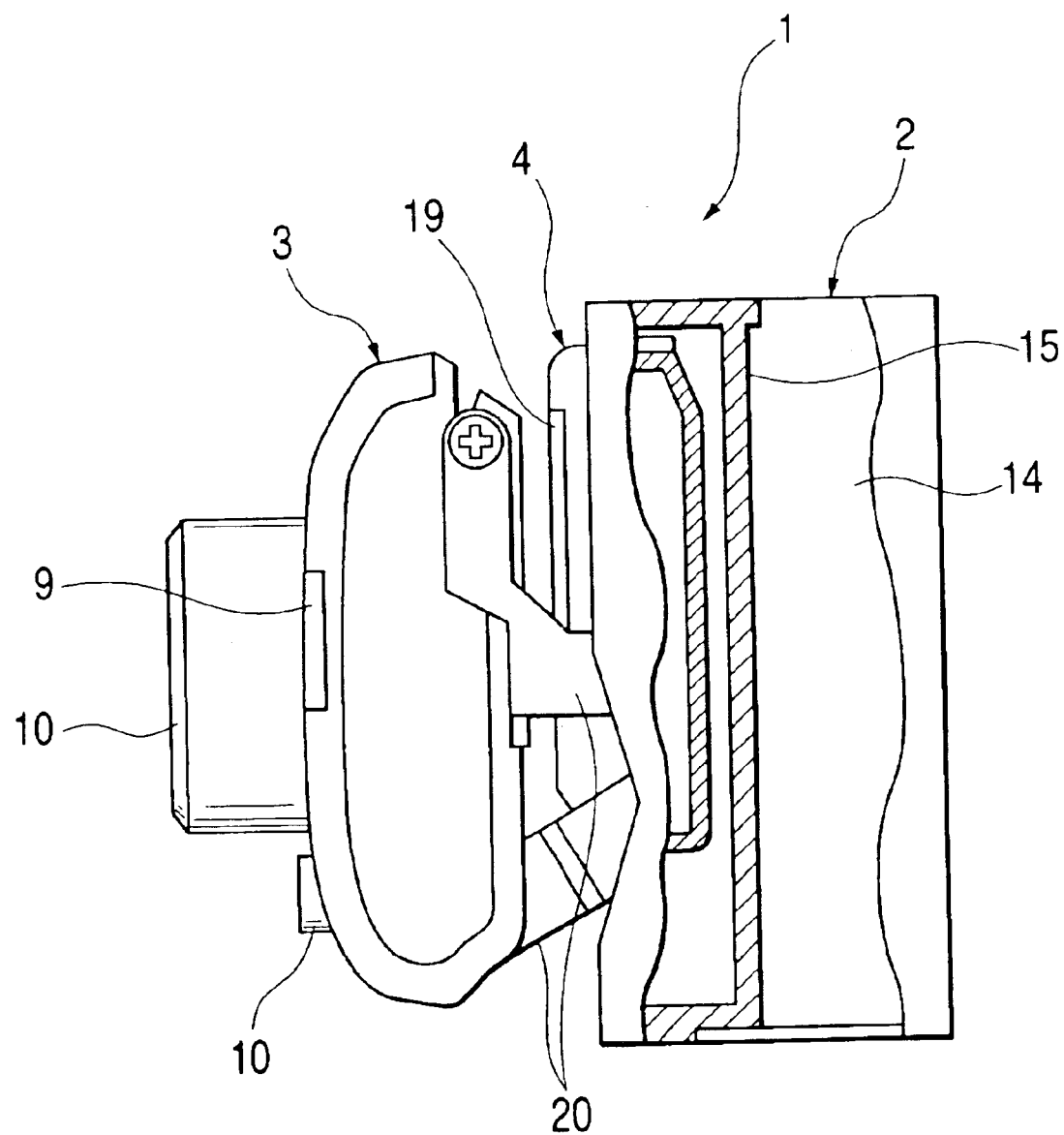
FIG. 3 is a partially sectional side view taken along a line A—A of FIG. 2.
Figure 4:
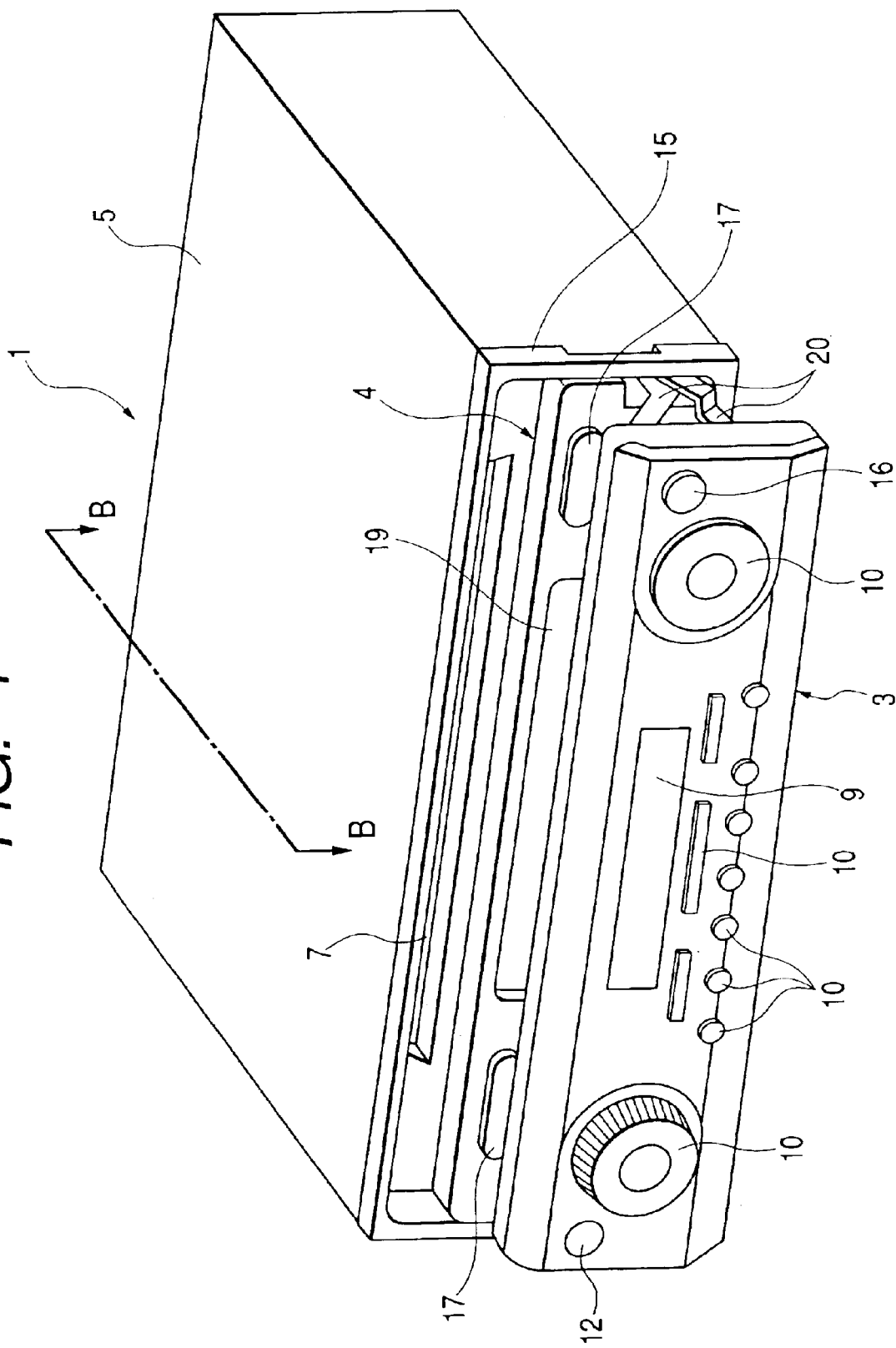
FIG. 4 is a perspective view showing a operation state of the electronic equipment.
Figure 5:
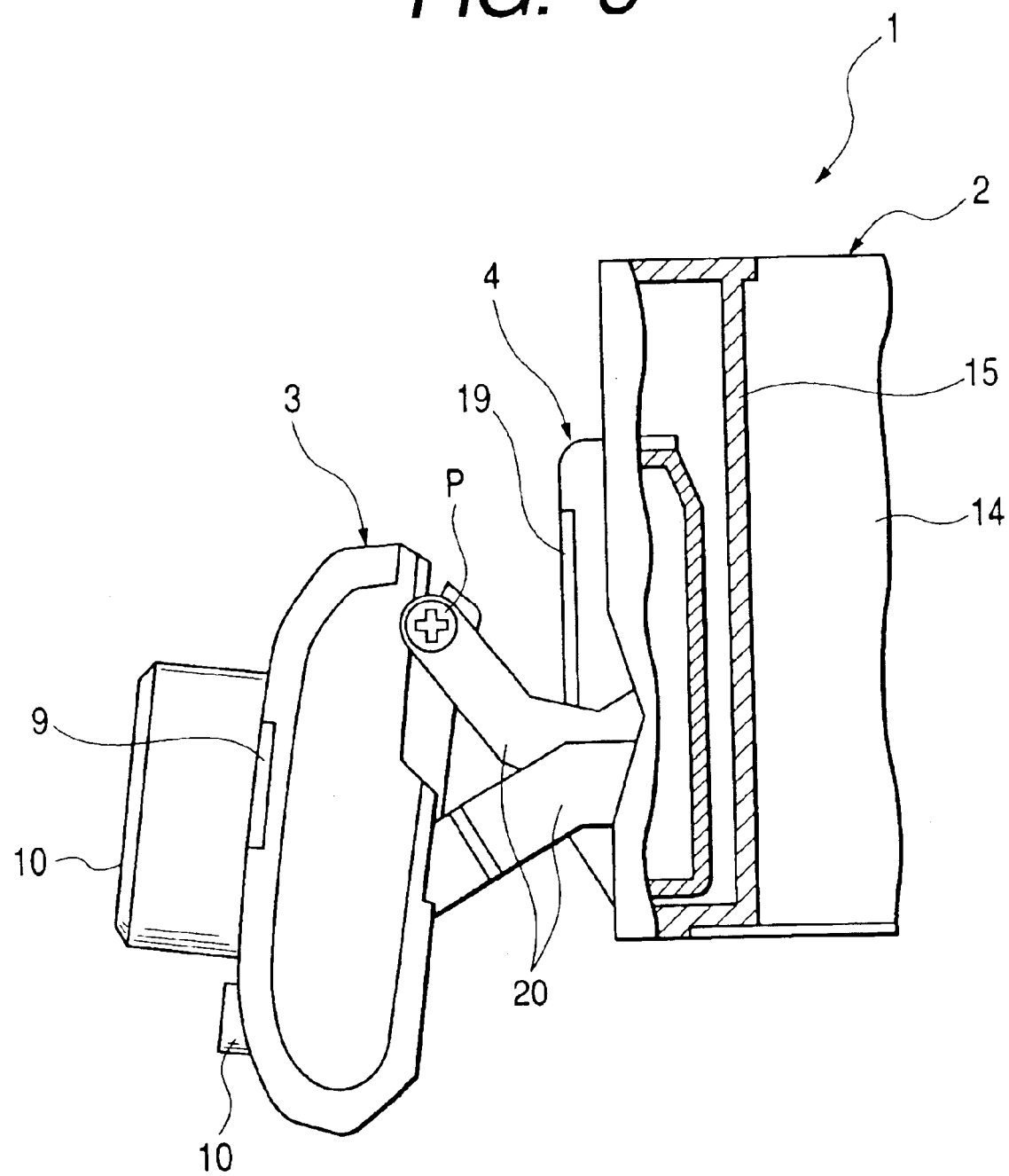
FIG. 5 is a partially sectional side view taken along a line B—B of FIG. 4.
Figure 6:
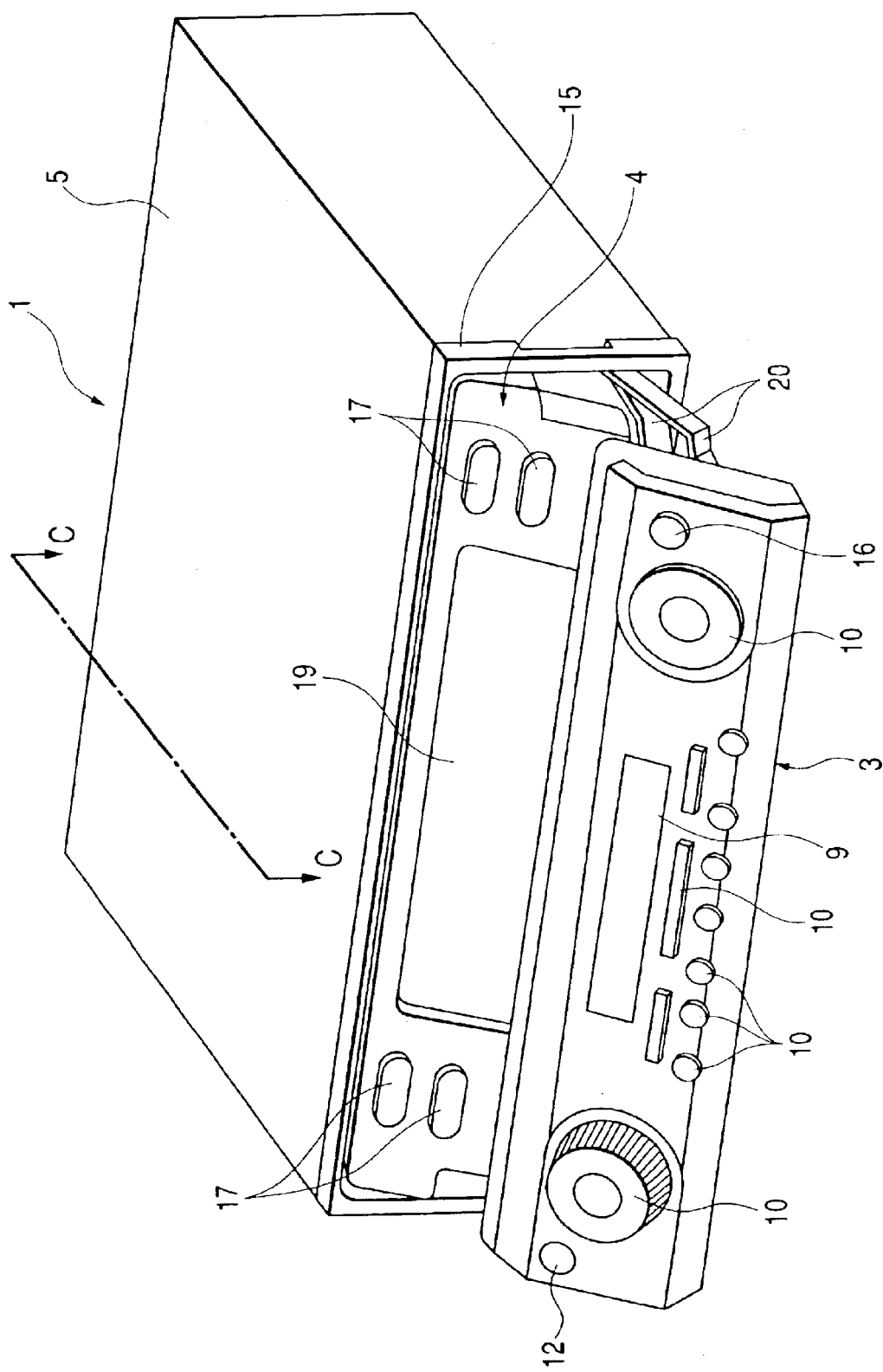
FIG. 6 is a perspective view showing another operation state of the electronic equipment.
Figure 7:
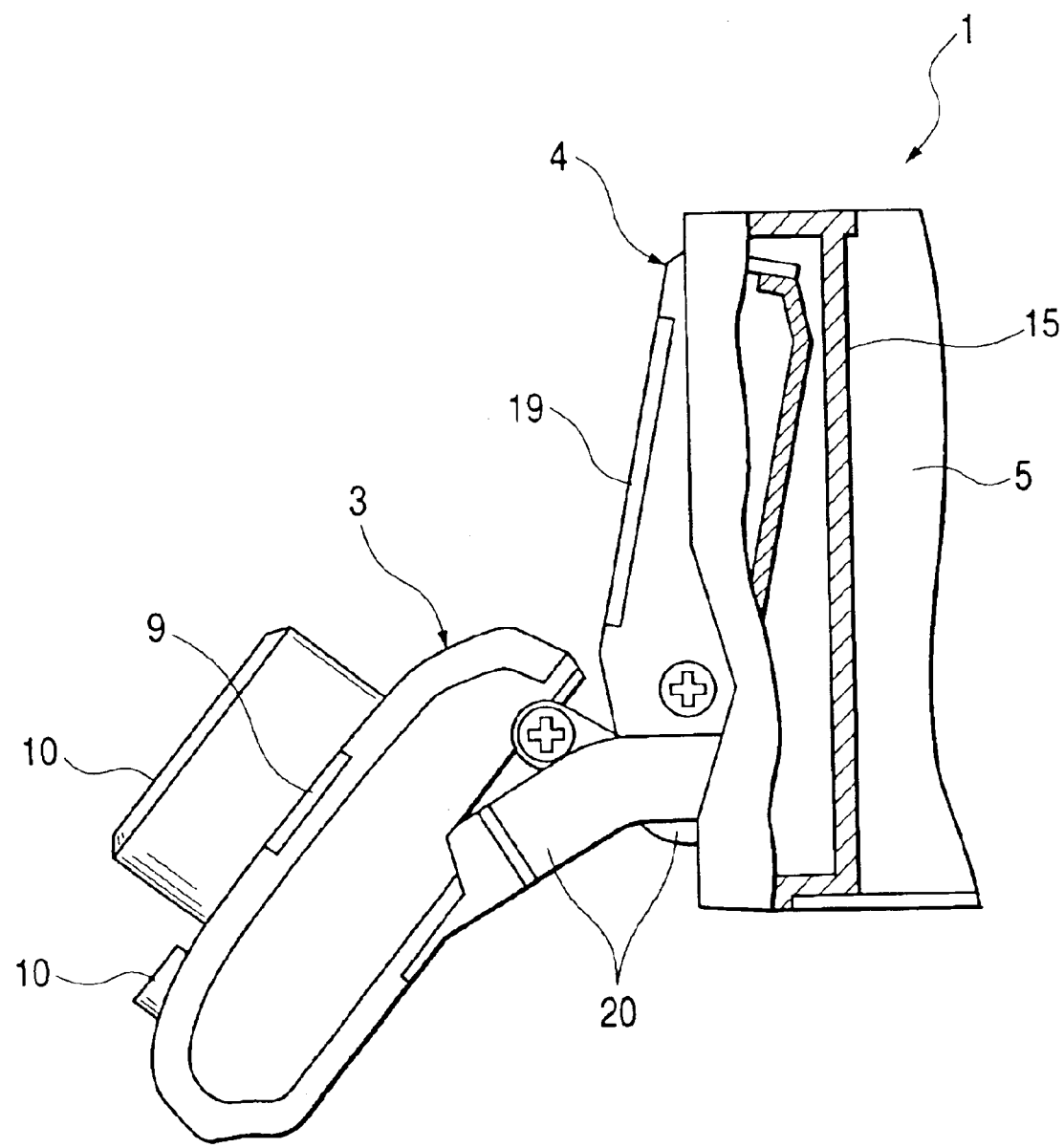
FIG. 7 is a partially sectional side view taken along a line C—C of FIG. 6.
Figure 8:
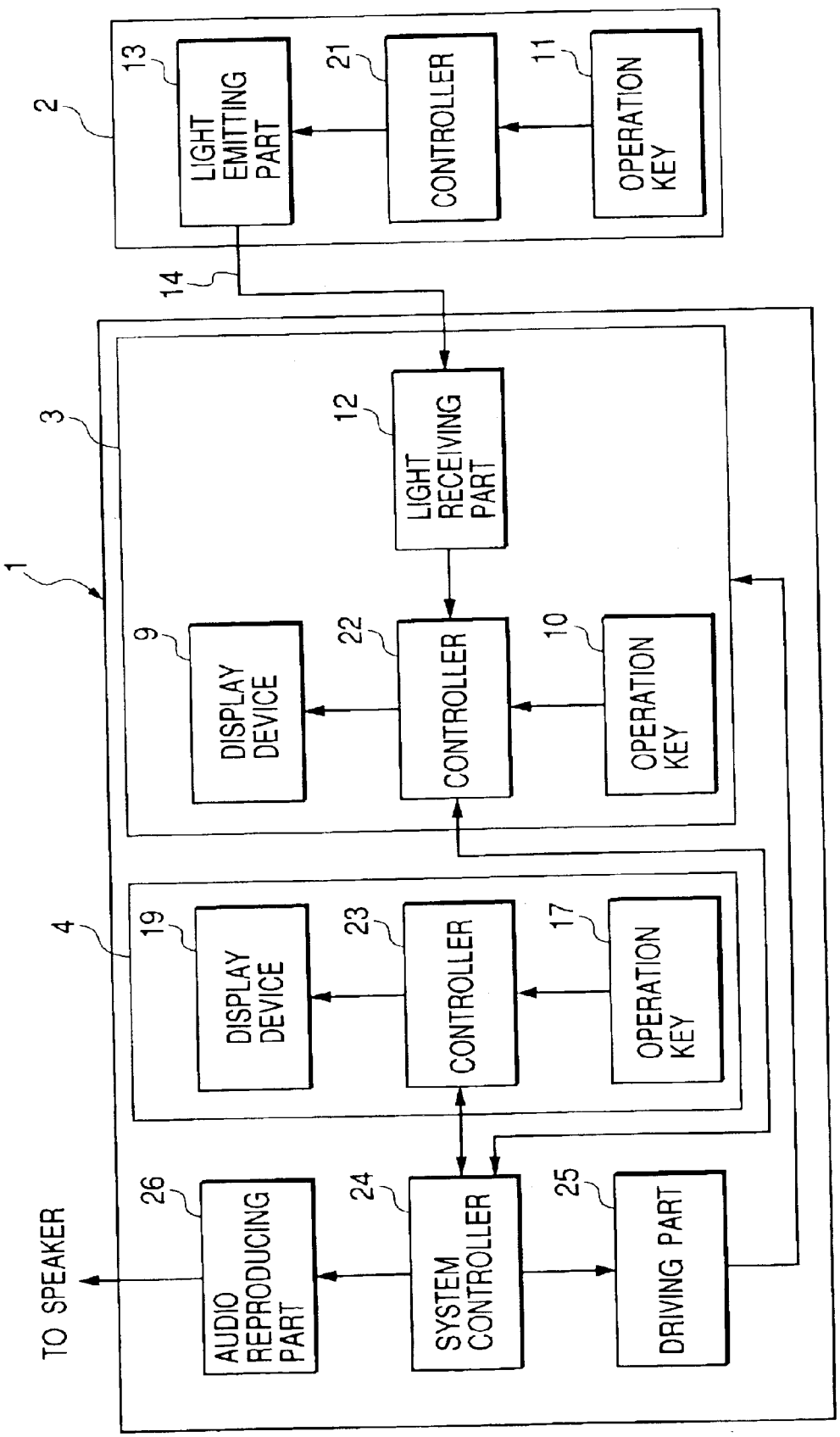
FIG. 8 is a block diagram showing a configuration of the electronic equipment control system.
Figure 9:
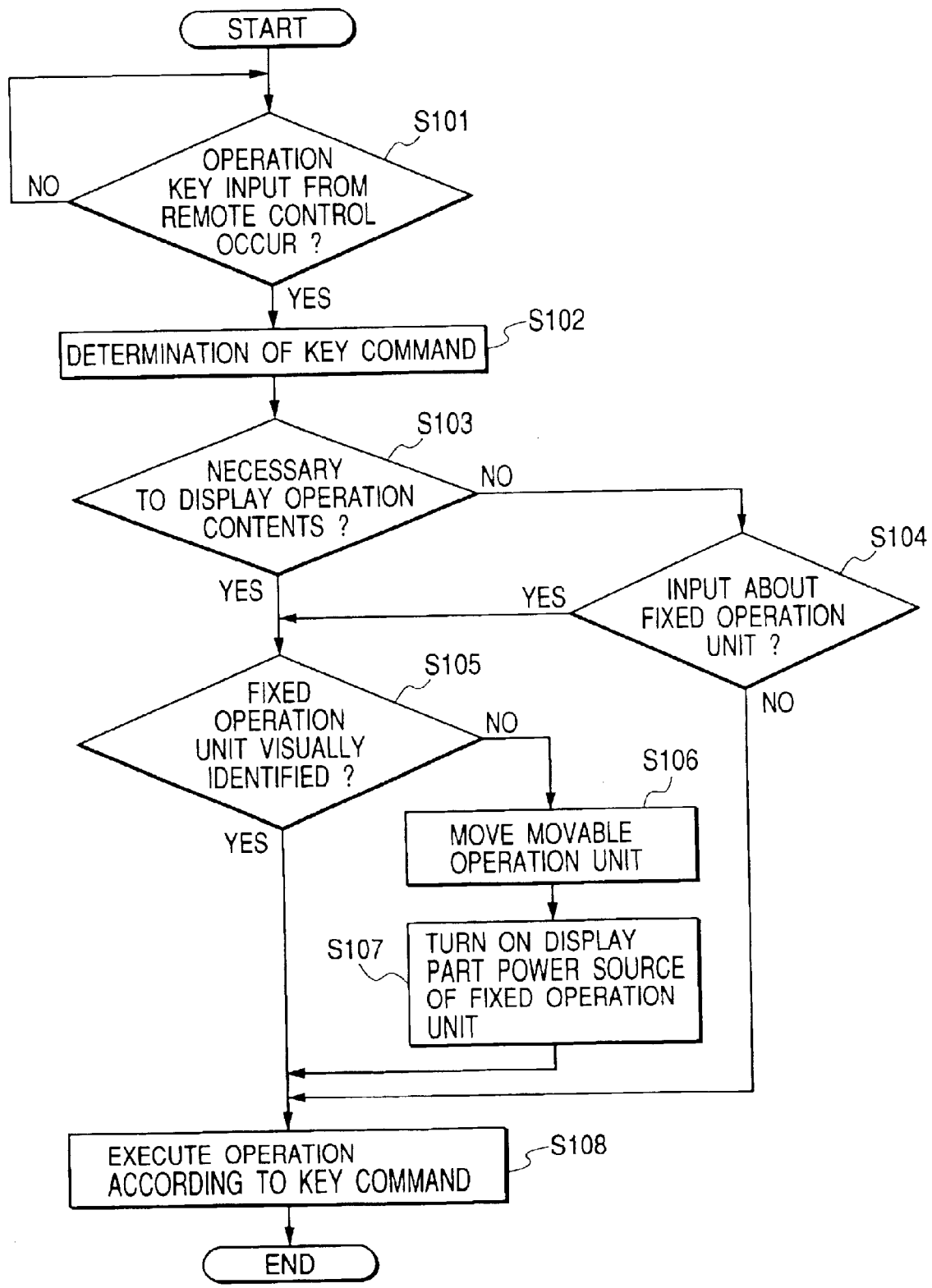
FIG. 9 is a flowchart showing a flow of operations of the electronic equipment control system.

The present invention will be described below with reference to FIGS. 1 to 10. FIG. 1 is an external view showing an electronic equipment body and a remote control terminal forming an electronic equipment control system of the invention. FIG. 2 is a perspective view of the electronic equipment body in a first state and FIG. 3 is a partially sectional side view of its movable part. FIG. 4 is a perspective view of the electronic equipment body in a second state and FIG. 5 is a partially sectional side view of its movable part. FIG. 6 is a perspective view of the electronic equipment body in a third state and FIG. 7 is a partially sectional side view of its movable part. FIG. 8 is a block configuration diagram of the electronic equipment control system of the invention, FIG. 9 is a flowchart showing a flow of its operation and FIG. 10 is a sequence chart showing a relation of its component.

As shown in FIG. 1, the electronic equipment system of the invention is a system having an electronic equipment body 1 and a remote control terminal 2. The electronic equipment body 1 has various components for performing functions of electronic equipment, for example, a CD reproducing mechanism, an MD reproducing mechanism and CD, MD holding parts for an audio reproducing apparatus, a tuner for receiving an AM/FM broadcast radio wave and demodulating means for making conversion from a received radio wave to an audio signal for a radio receiving apparatus, a channel tuner for receiving a video radio wave and demodulating means for demodulating a video signal or an audio signal from a received radio wave for a television. Those are provided in side an electronic equipment cabinet 5. A display device of an operation unit may be used as a video display of television.

Operation keys for operating electronic equipment are provided on two operation units being superposed in the front of a front panel 15 of the electronic equipment body 1. The front one of the two operation units is a first operation unit (hereinafter referred to as "a movable operation unit 3"), and the operation unit hidden and placed in the back of the first operation unit is a second operation unit (hereinafter referred to as "a fixed operation unit 4").

On the front face of the movable operation unit 3, there is provided a display device 9, various operation keys 10, a light receiving part 12 and an open/close key 16. On the fixed operation unit 4, there is provided operation keys 17 and a display device 19 as shown in FIG. 6. The open/close key 16 enables the movable operation unit 3 to be moved to a predetermined position manually by operating this key, so that the fixed operation unit 4 can be identified visually.

A liquid crystal display device may be used as the display device 9. An organic EL (Electro-Luminescence) display device may be used as the display device 19.

By providing the two operation units of the movable operation unit 3 and the fixed operation unit 4, many operation keys can be placed in narrow front space of the electronic equipment body and also the large display device 19 can be provided. When using the fixed operation unit 4, the movable operation unit 3 is moved to a predetermined position so that the fixed operation unit 4 is well visible to a user as described in detail below.

The remote control terminal 2 comprises various operation keys 11 and a light emitting part (sending part) 13 of infrared rays 14. When the operation key 11 is operated, a key command according to the operation is generated and the key command is modulated by a format suitable for sending by the infrared rays 14 in a modulating part (not shown) and a light emitting element in the light emitting part 13 is illuminated and controlled by its modulated signal and radiation is performed to the electronic equipment body 1. The radiated infrared rays 14 are received by the light receiving part 12 provided in the movable operation unit 3 of the electronic equipment body 1. An infrared light emitting diode is preferably used as the light emitting element.

The operation keys 11 of the remote control terminal 2 provides instructions on operation of the movable operation unit 3 and operation of the fixed operation unit 4. A key for selecting the movable operation unit 3 and the fixed operation unit 4 is not provided.

This structure is the feature of the invention. Even in case of providing an instruction on the fixed operation unit 4 hiding in the back of the movable operation unit 3 and being invisible, the instruction is received by the light receiving part 12 of the movable operation unit 3. When it is determined that the instruction is provided for the fixed operation unit 4 or for using the display device 19 of the fixed operation unit 4, the movable operation unit 3 is automatically moved to a predetermined position and the fixed operation unit 4 becomes a state capable of visual identification and the operation is continued.

Therefore, a user can perform an operation of the electronic equipment body 1 without being aware whether its operation is the operation about the movable operation unit 3 or about the fixed operation unit 4.

Next, a configuration and functions of the electronic equipment body 1 constituting the electronic equipment control system will be described. FIG. 2 is a view in which the movable operation unit 3 of the electronic equipment body 1 is held in a predetermined portion of the front panel 15 of the electronic equipment body 1, and the fixed operation unit 4 is held in the back of the movable operation unit 3. FIG. 3 is a partial sectional side view of the electronic equipment body 1 taken along a line A—A of FIG. 2. In the movable operation unit 3, the display device 9, many operation keys 10, the light receiving part 12, the open/close key 16, etc. are disposed. Due to a narrow space, a large display device cannot be disposed. Therefore, a small display device for displaying only a predetermined function is placed. In this state, the fixed operation unit 4 is in the back of the movable operation unit 3, and functions that the fixed operation unit 4 has cannot be viewed directly and cannot be identified.

FIG. 4 shows a state in which the remote control terminal 2 provides an instruction for the fixed operation unit 4 and the movable operation unit 3 and the fixed operation unit 4 are being moved. FIG. 4 shows a state in which the fixed operation unit 4 is slightly moved downwardly so as to utilize a disk insertion opening 7. FIG. 5 is a partial sectional side view of the electronic equipment body 1 taken along a line B—B of FIG. 4.

There is an apparatus such as radio in which a record medium is not mounted. In such a case, it is unnecessary to move the fixed operation unit 4. If an apparatus has a portion to be operated in the back of the fixed operation unit 4, the fixed operation unit 4 may be moved by the necessary amount. Also, the fixed operation unit 4 may be inclined so that a display surface is easily watched.

Movement of the movable operation unit 3 is performed by an arm 20 and a cam (not shown). Also, when movement of the fixed operation unit 4 is required, the movement can be performed by a similar mechanism.

FIG. 6 shows a state in which the movable operation unit 3 is moved and set to the end position. FIG. 7 is a partial sectional side view of the electronic equipment body 1 taken along a line C—C of FIG. 6.

In this state, the movable operation unit 3 is set by the arm 20 in, for example, a direction in which the operation surface is well visible to a driver so that it is easy for a user to identify visually. Also, the fixed operation unit 4 is set in a direction in which the operation surface turns slightly upward so that the operation surface is well visible to the user. In this state, an operation from the remote control terminal 2 is performed. Also in this state, the electronic equipment body 1 can be operated by operating the operation keys 10 of the movable operation unit 3 or the operation keys 11 of the fixed operation unit 4.

By providing the operation keys about operations of electronic equipment on a panel surface of the movable operation unit 3 mainly, the display device 19 of the fixed operation unit 4 can be made large with high accuracy. Details of remote control can be displayed on this display device 19. The display device 19 of the fixed operation unit 4 may be used to show the details about a function of the movable operation unit 3. Therefore, even when the fixed operation unit 4 is not operated, the movable operation unit 3 may be automatically moved so that the display device 19 of the fixed operation unit 4 is visible depending upon a decision of the electronic equipment.

Next, a block configuration of a system will be described. As shown in FIG. 8, an operation and control system of the electronic equipment body 1 includes the movable operation unit 3, the fixed operation unit 4, a system controller 24 of the whole apparatus, and a driving part 25 for moving the movable operation unit 3. In case in which the electronic equipment body 1 is an audio reproducing apparatus or the like, an audio reproducing part 26 is provided as well. The movable operation unit 3 is provided with the light receiving part 12, a controller 20, the display device 9 and the operation keys 10. The fixed operation unit 4 is provided with a controller 23, the display device 19 and the operation keys 17.

The remote control terminal 2 serving as a device for performing remote control is provided with a controller 21, the operation keys 11 and the light emitting part (sending part) 13.

When a user inputs by operating the operation keys 11 from the remote control terminal 2 to perform operation and control of the electronic equipment body 1, a selected operation signal is converted into a code corresponding to the operation by deciding the operation contents in the controller 21. The signal converted into the code is sent to the light emitting part 13 under control of the controller 21 and a control signal is emitted from the light emitting part 13 toward the electronic equipment body 1.

The infrared rays 14 are used as transmission means of a signal. An infrared light emitting diode is preferable as a light source. The light emitting diode enables low voltage driving and modulation is easy and also power consumption is small and it is suitable for a cordless remote control terminal 2. Also, a sufficiently high modulation frequency is obtained.

The modulated infrared rays 14 sent from the remote control terminal 2 are received by the light receiving part 12 of the movable operation unit 3 of the electronic equipment body 1. The received signal is processed and is input to the system controller 24 through the controller 22 and meaning of its signal is deciphered. The signal having an extent capable of displaying by the small display device 9 is displayed on the display device 9 after doing input to the controller 22 and making conversion to display data.

Also, a user can input operation information directly from the operation keys 10. It is possible to use a general-purpose photodiode or phototransistor as a light receiving element of the light receiving part 12. These elements achieve low voltage driving and low power consumption and also a sufficiently high frequency band.

In case in which the received signal is determined by the system controller 24 to be relating to instructions to the fixed operation unit 4, or to be relating to instructions to the movable operation unit 3, and detailed information display is required, information is displayed on the display device 19 of the fixed operation unit 4. Since it is necessary to place many operation keys 10 in the movable operation unit 3, a large display device can not be provided. Therefore, detailed information about control is displayed on the display device 19 of the fixed operation unit 4.

At this time, it is necessary to move the movable operation unit 3 so that the display device 19 comes within sight of a user. For that purpose, information is transmitted from the system controller 24 to the controller 23 and the information is input to the display device 19 by the controller 23. Also, the driving part 25 is actuated and controlled by the system controller 24 and the movable operation unit 3 is moved to a predetermined position and the display device 19 of the fixed operation unit 4 is placed so as to be visually identified by the user. Also, the audio reproducing part 26 acts according to operation instruction input.

The system described above is not limited to electronic equipment for handling audio, and may be used in electronic equipment for handling video. Also, it is not limited to vehicle-mounted equipment, and may be applied to electronic equipment used in home.

Next, a flow of operation of the electronic equipment control system of the invention will be described with reference to FIG. 9.

First, it waits until an operation key input from a remote control terminal occurs (step S101). When the operation key input occurs, a key command is determined (step S102). It is determined whether or not this key command is a command necessary to display the operation contents (step S103). When it is not necessary to display the operation contents, it is determined whether or not the input is about the fixed operation unit 4 (step S104). When the input is not about the fixed operation unit 4, an operation according to the key command is executed as it is (step S108).

On the other hand, in the case of Yes in step S103 and step S104, it is determined whether or not the fixed operation unit 4 can be visually identified (step S105). When it cannot be visually identified, it means that the movable operation unit 3 is in a position of covering the front of the fixed operation unit 4, and the movable operation unit 3 is moved so that the fixed operation unit 4 can be visually identified (step S106). In this movement, the driving part 25 is actuated and the movement is performed by this driving part 25, the movable operation unit 3 and a joint mechanism (not shown).

Thereafter, a power source of the display device 19 of the fixed operation unit 4 is turned on (step S107). After turning on the power source of the display device 19, an operation according to the key command is executed (step S108).

Also, when it is determined that the fixed operation unit 4 can be visually identified in step S105, an operation according to the key command is immediately executed (step S108) Even when there is the input about the fixed operation unit 4 in step S104, it may be constructed so as to perform an operation of step S108 without moving the movable operation unit 3 if the operation content is unnecessary to display on the display device 19.

One example of the flow of operation of the electronic equipment control system has been described above, but a flow of other operation for implementing a technical idea of the invention may be constructed.

Next, interaction between components of the electronic equipment control system will be described with a flow of time with reference to a sequence chart of FIG. 10. In the chart, arrows show directions of operation, and a longitudinal direction indicates a lapse of time. The components include a user, the remote control terminal 2, the system controller 24, the movable operation unit 3 and the fixed operation unit 4.

First, a user operates a predetermined operation key 11 of the remote control terminal 2 to perform a desired operation of the electronic equipment body 1 (step S201) The contents of the operation key 11 operated from the remote control terminal 2 to the movable operation unit 3 are emitted from the light emitting part 13 by modulating the infrared rays 14 (step S202) and are received by the light receiving part 12 of the movable operation unit 3 (step S203).

The received contents are transmitted from the controller 22 to the system controller 24 (step S204) and it is determined whether or not it is necessary to display the operation contents (step S205). When it is not necessary to display, the system controller 24 informs the movable operation unit 3 and the fixed operation unit 4 that it is an operation without displaying on the display device 19 (step S206), and the movable operation unit 3 and the fixed operation unit 4 perform the operation input from the operation key 11 without display (step S207, step S208).

Next, when it is determined that it is necessary to display the operation contents on the fixed operation unit 4 in step S205 and it is determined that the fixed operation unit 4 is in a position incapable of visual identification (step S205a: NO), a movement of the movable operation unit 3 is started (step S209). The driving part 25 is actuated and the movement is performed by this driving part 25, the movable operation unit 3 and a joint mechanism (not shown) (step S210).

After the movable operation unit 3 is moved and the fixed operation unit 4 becomes a visible state (step S211), the system controller 24 informs the movable operation unit 3 and the fixed operation unit 4 that it is in a state of an operation with display to the display device 19 (step S212), and the movable operation unit 3 and the fixed operation unit 4 perform the operation input from the operation key 11 in a state with display (step S213, step S214).

As described in detail above, in the electronic equipment control system of the invention and the method thereof, when an operation for requiring a function of the fixed operation unit is input from the remote control terminal even in a state in which the movable operation unit is closed and the fixed operation unit is hidden and invisible, the movable operation unit is moved automatically and the fixed operation unit is set in a visible state and the operation, control of electronic equipment can be performed. That is, a user can perform an operation in an operation feeling similar to the operation unit provided in the front of the normal electronic equipment body without the need to be aware whether there is an operation for using a function of the movable operation unit or an operation for using a function of the fixed operation unit.

In the embodiment described above, it may be constructed so that a main power source of the movable operation unit and a main power source of the fixed operation unit can be divided and controlled and the power source of the fixed operation unit is turned off in a state in which the fixed operation unit is invisible as shown in FIG. 2 and the power source of the fixed operation unit is turned on in a state in which the fixed operation unit is visible as shown in FIGS. 4 and 6. In the case of being constructed thus, power consumption in the fixed operation unit can be reduced and further, useless display is not performed in a display device of the fixed operation unit and thereby a life of the display device can also be extended. Further, at the time when it is moved from the state in which the fixed operation unit is visible as shown in FIGS. 4 and 6 to the state in which the fixed operation unit is invisible as shown in FIG. 2, the power source of the fixed operation unit or the power source of at least the display device can be turned off again.

Moreover, in the embodiment described above, the electronic equipment body may be constructed so that a slot for record medium insertion of CD, DVD, MD, cassette tape, etc. is exposed at the time of moving the operation unit of the back side. Or, the electronic equipment body may be constructed so that a third operation unit is exposed at the time of moving the operation unit of the back side. In this case, when the remote control signal relates to use of a function which the third operation unit has, it may be placed and changed to a state in which the third operation unit can be visually identified from the outside. As a result of this, a remote control operation through the third operation unit can also be performed preferably.

The invention is not limited to the embodiment described above, and can be changed properly without departing from the claims and the subject matter or the idea of the invention capable of being read from the whole specification, and an electronic equipment control system with such a change and a control method thereof are also included in the technical idea of the invention.

As described above, according to an electronic equipment control system of the invention and a method thereof, when an operation input about a function of a fixed operation unit is inputted from a remote control terminal even in a state in which a movable operation unit is closed and the fixed operation unit is hidden and invisible, the movable operation unit moves automatically and the fixed operation unit is set in a visible state, so that the operation and control of electronic equipment can be performed while visually identifying information displayed on a display device of the fixed operation unit.

Also, when the operation contents are displayed on the display device of the fixed operation unit even in the case that the movable operation unit is in a closed state and an operation about the movable operation unit is performed, the movable operation unit moves automatically and the operation and control of the electronic equipment can be performed while identifying the operation contents displayed on the display device of the fixed operation unit.

Therefore, when a user performs remote control, particularly, the user can perform the operation and control of the electronic equipment without being aware whether there is an operation for using a function of the movable operation unit or an operation for using a function of the fixed operation unit. That is, an operation can be performed in an operation feeling similar to the operation unit provided in the normal front without being aware of the operation unit of the hidden side.

What is claimed is:

1. An electronic equipment control system comprising:
   an electronic equipment body; and
   a remote control terminal which provides an operation instruction to the electronic equipment body,
   wherein the electronic equipment body comprises:
      a receiving part which receives a remote control signal;
      a first operation unit to be operated according to the received remote control signal;
      a second operation unit disposed in the back of the first operation unit and operated according to the received remote control signal, the second operation unit being equipped with a display part, facing the back of the first operation unit, which displays information about an operation or an operation state of at least one of the first and second operation units; and
   an arranging part which moves at least one of the first and second operation units to bring both of the first and second operation units into a visually identifiable state,
   wherein the remote control terminal comprises:
      an input key which provides the operation instruction; and
      a sending part which sends the operation instruction to the electronic equipment body as the remote control signal.

2. An electronic equipment control system as claimed in claim 1, wherein the first operation unit further comprises a display part for displaying information about an operation or an operation state of the first operation unit.

3. An electronic equipment control system as claimed in claim 1, wherein the arranging part works to bring the second operation unit into a visually identifiable state when the remote control signal relates to an operation to be displayed on the display part of the second operation unit and the second operation unit is in a visually unidentifiable state.

4. An electronic equipment control system as claimed in claim 1, wherein a power source of at least the display part of the second operation unit is turned off when the second operation unit is in a visually unidentifiable state.

5. An electronic equipment control system as claimed in claim 1, wherein reception of the remote control signal relating to use of a second operation unit function does not make the second operation unit perform an operation corresponding to the remote control signal when the second operation unit is in a visually unidentifiable state, and makes the second operation unit perform the operation corresponding to the remote control signal when the second operation unit is in a visually identifiable state.

6. An electronic equipment control system as claimed in claim 1, wherein the electronic equipment body further comprises a determination part for determining whether or not the received remote control signal relates to use of a second operation unit function.

7. An electronic equipment control system as claimed in claim 6, wherein the arranging part works to bring the second operation unit into a visually identifiable state when the determination part determines that the remote control signal relates to use of the second operation unit function.

8. An electronic equipment control system as claimed in claim 6, wherein a power source of the second operation unit is turned on when the determination part determines that the remote control signal relates to use of the second operation unit function.

9. An electronic equipment control system as claimed in claim 1, wherein the receiving part is disposed on the first operation unit.

10. An electronic equipment control system as claimed in claim 1, wherein the receiving part is disposed at a cabinet front portion of the electronic equipment body.

11. An electronic equipment control system as claimed in claim 1, wherein the remote control signal is sent using infrared rays.

12. An electronic equipment control system as claimed in claim 1, wherein the remote control signal is sent using radio waves.

13. An electronic equipment control system as claimed in claim 1, wherein the electronic equipment body further comprises at least one of a reproducing part for reproducing music content information, a radio broadcast receiving part and a television broadcast receiving part.

14. An electronic equipment control system as claimed in claim 1, wherein the electronic equipment body further comprises a slot for record medium insertion, the slot is exposed when the second operation unit is moved.

15. An electronic equipment control system as claimed in claim 1, wherein the electronic equipment body further comprises a third operation unit for operating the electronic equipment body, the third operation unit is exposed when the second operation unit is moved, and
   wherein the arranging part moves the second operation unit to bring the third operation unit into a visually identifiable state when the remote control signal relates to use of a third operation unit function.

16. An electronic equipment control method in an electronic equipment control system comprising an electronic equipment body and a remote control terminal for providing an operation instruction to the electronic equipment body, the method comprising:
   receiving a remote control signal by the electronic equipment body;
   a first operation of operating the electronic equipment body according to the received remote control signal by a first operation unit of the electronic equipment body;
   a second operation of operating the electronic equipment body according to the received remote control signal by a second operation unit provided in the back of the first operation unit;
   an arrangement operation of moving at least one of the first and second operation units to bring both of the first and second operation units into a visually identifiable state;
   inputting an operation instruction to the electronic equipment body by input keys of the remote control terminal, the second operation unit being equipped with a display part facing the back of the first operation unit for displaying information about an operation or an operation state of at least one of the first and second operation units; and sending the operation instruction toward the electronic equipment body by the remote control terminal as the remote control signal.

17. An electronic equipment control method as claimed in claim 16, further comprising:

determining whether or not the received remote control signal relates to use of a second operation unit function, wherein the second operation unit is brought into a visually identifiable state in the arrangement operation when the remote control signal is determined to relate to use of the second operation unit function.

18. An electronic equipment control system comprising:

an electronic equipment body; and means for providing an operation instruction to the electronic equipment body, wherein the electronic equipment body comprises:

means for receiving a remote control signal;

a first operation unit to be operated according to the received remote control signal;

a second operation unit disposed in the back of the first operation unit and operated according to the received remote control signal, the second operation unit being equipped with a means for displaying information about an operation or an operation state of at least one of the first and second operation units, said means for displaying facing the back of the first operation unit; and means for moving at least one of the first and second operation units to bring both of the first and second operation units into a visually identifiable state.

19. An electronic equipment control system as claimed in claim 18, wherein the first operation unit further comprises a means for displaying information about an operation or an operation state of the first operation unit.

* * * * *